United States Patent [19]

Concannon

[11] Patent Number: 4,616,150

[45] Date of Patent: Oct. 7, 1986

[54] INTERPOLE ASSEMBLY FOR A DC MACHINE

[75] Inventor: Brian T. Concannon, Bolingbrook, Ill.

[73] Assignee: General Motors Corporation, Detroit, Mich.

[21] Appl. No.: 695,476

[22] Filed: Jan. 28, 1985

[51] Int. Cl.[4] .............................................. H02K 1/10
[52] U.S. Cl. .................................................. 310/186
[58] Field of Search ............... 310/177, 180, 183, 186, 310/224, 225, 190–193, 216–218, 220–223; 322/64–66; 318/521, 530

[56] References Cited

U.S. PATENT DOCUMENTS

| | | | |
|---|---|---|---|
| 665,586 | 1/1901 | Siemens et al. | 310/186 |
| 1,401,697 | 12/1921 | Henninger | 310/186 X |
| 1,523,004 | 1/1965 | Doherty | 310/186 |
| 2,475,535 | 7/1949 | Weilbaecher | 310/186 X |
| 4,041,338 | 8/1977 | Madsen et al. | 310/186 |
| 4,220,882 | 9/1980 | Kohzai et al. | 310/186 |
| 4,307,312 | 12/1981 | Kohzai et al. | 310/186 |
| 4,338,535 | 7/1982 | Kohzai et al. | 310/186 |
| 4,374,337 | 2/1983 | Lohzai et al. | 310/186 |
| 4,433,472 | 2/1984 | Andoh et al. | 310/186 X |
| 4,435,664 | 3/1984 | Boesel | 310/186 |
| 4,439,703 | 3/1984 | Kohzai et al. | 310/186 |
| 4,451,751 | 5/1984 | Tahara et al. | 310/186 |

Primary Examiner—Mark O. Budd
Attorney, Agent, or Firm—Mark A. Navarre

[57] ABSTRACT

A DC electric machine interpole disposed between adjacent main field poles is magnetically isolated from the machine frame and is characterized in that the pole piece or pieces which conduct interpole flux from the interpole into the armature is (are) longitudinally displaced and circumferentially adjacent to the pole piece or pieces which conduct interpole flux from the armature to the interpole. The longitudinal displacement of the sending and receiving pole pieces permits the circumferential width of the interpole to be relatively small thereby reducing flux leakage from main field pole to main field pole to effect an improvement in the performance of the machine.

5 Claims, 11 Drawing Figures

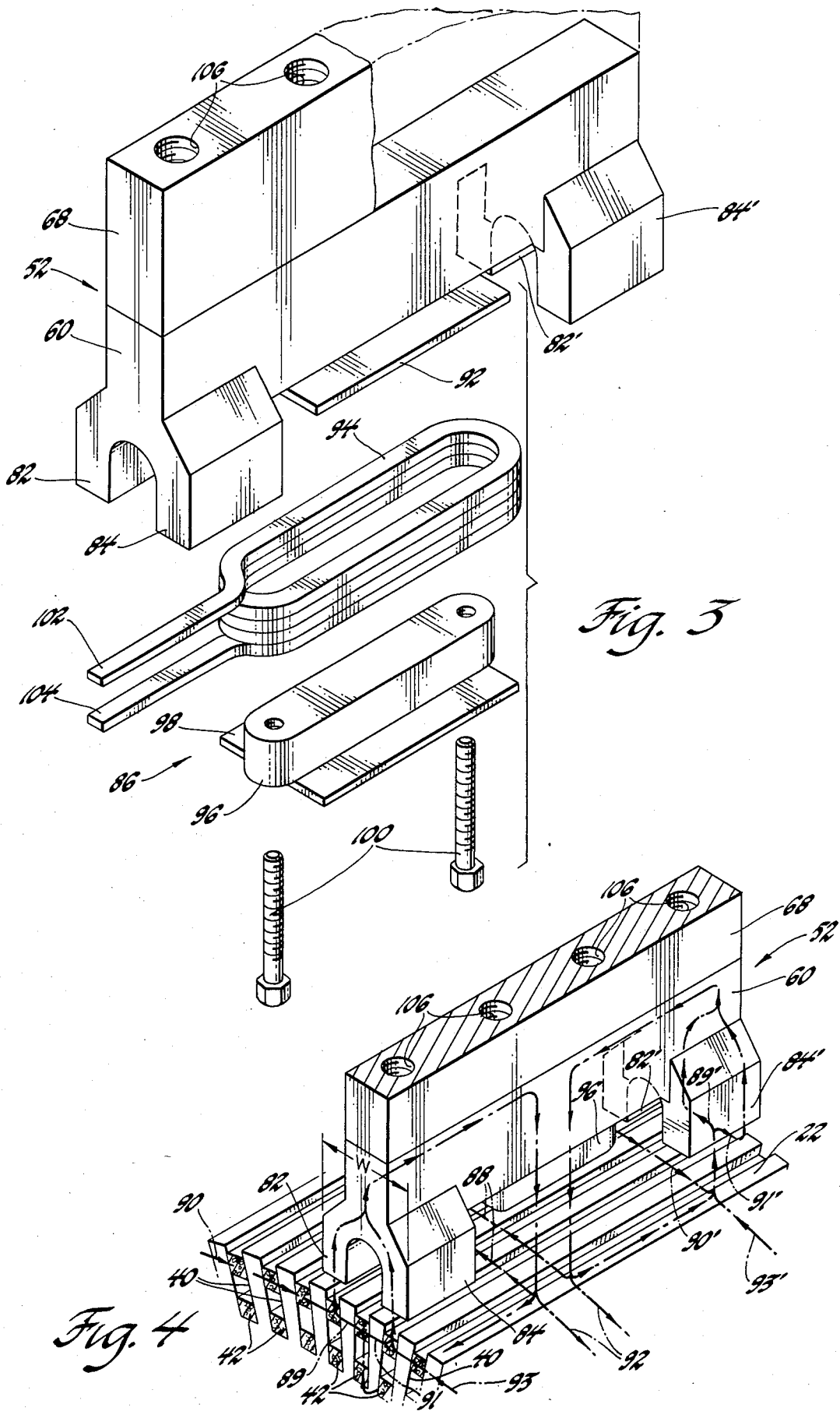

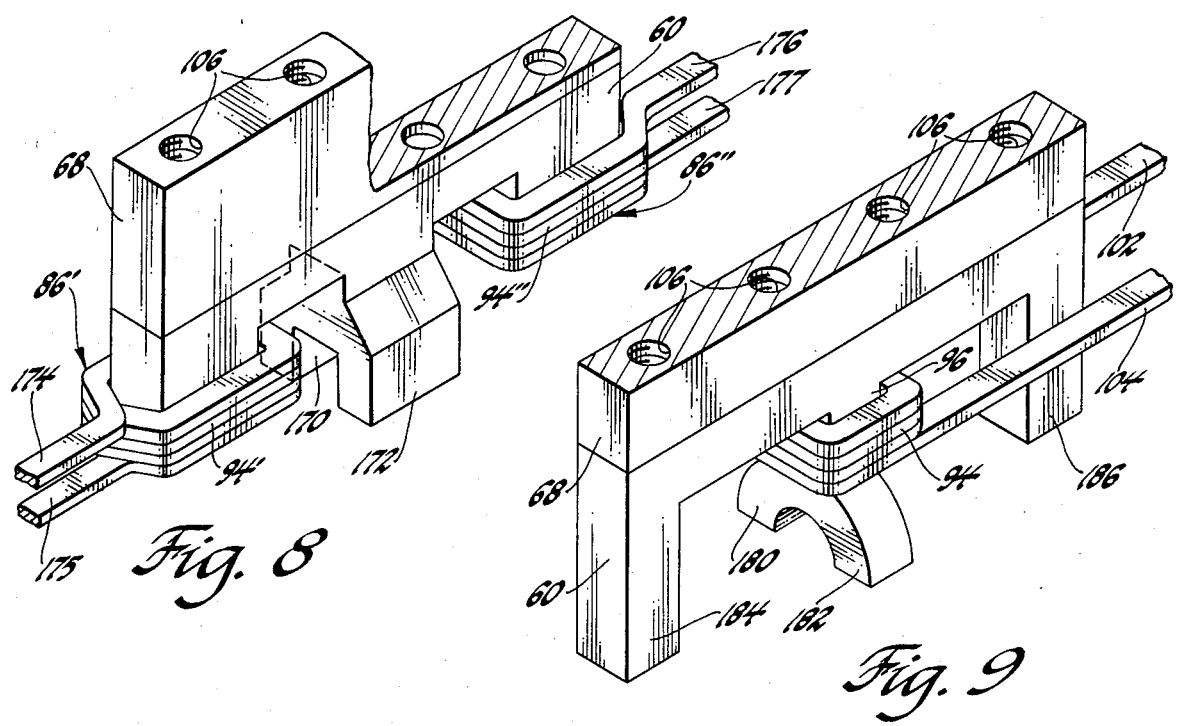
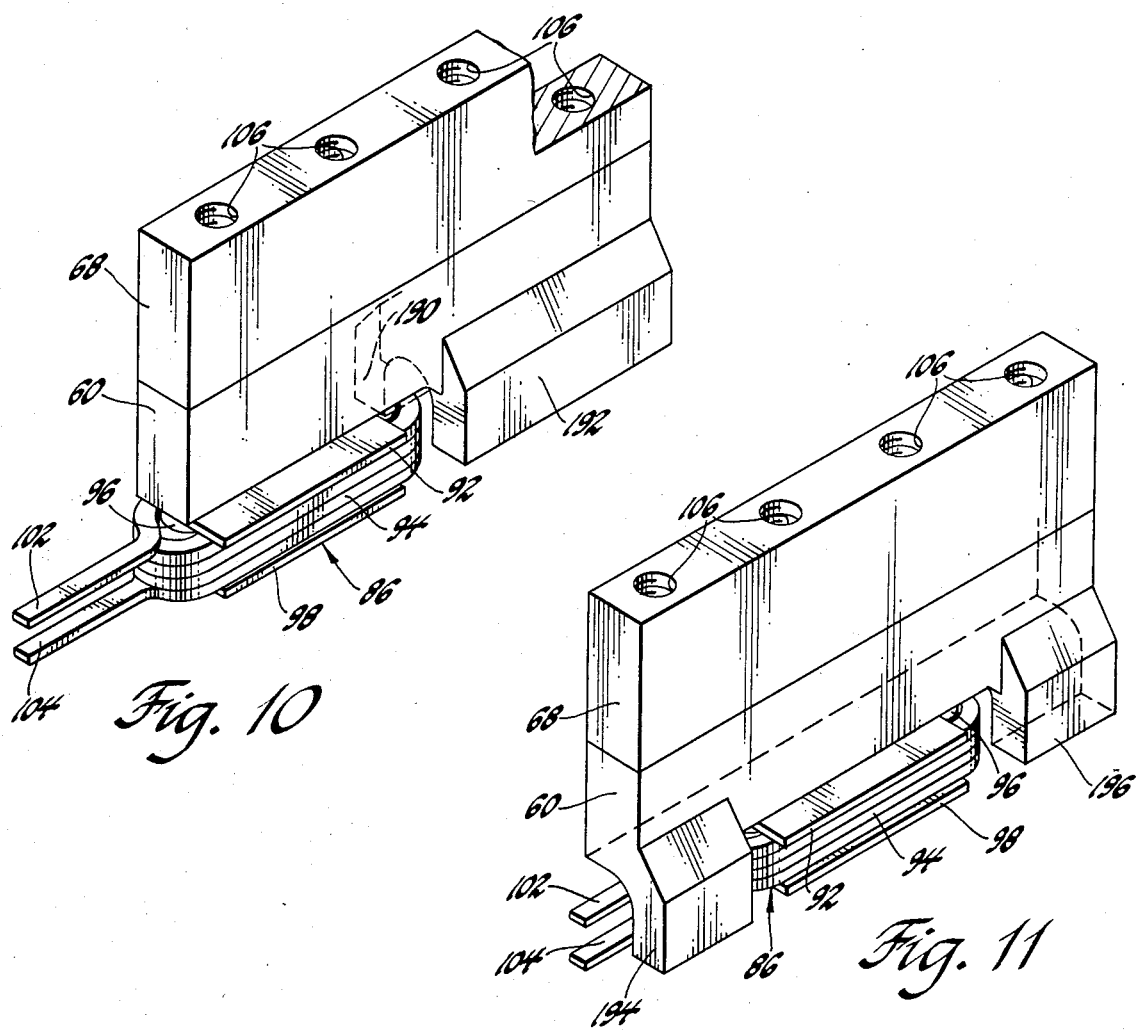

INTERPOLE ASSEMBLY FOR A DC MACHINE

This invention relates to commutation in a DC electric machine, and more particularly to an interpole mechanism for reducing commutator arcing.

The process of commutation in a DC electric motor or generator involves reversing the current polarity in the individual armature windings as they rotate through the magnetic neutral axes of the machine. In either case, the commutation is accomplished with a rotary member or commutator having a plurality of conductive segments electrically connected to individual armature coils and two or more stationary brushes which contact the segments as the respective coils rotate through the magnetic neutral axes of the machine. Inherent in the operation of the commutator and brushes is the fact that some armature coils are short-circuited through one or more of the brushes. In an ideal machine, such short-circuiting presents no problem since there should be no induced EMF in the coils as they pass through the magnetic neutral axes. However, it is well-known in the art that, in real machines, armature reaction effectively shifts the neutral axes of the machine in relation to the armature current thereby giving rise to an induced EMF in the coils passing through the actual neutral axes. In addition, self-inductance due to certain armature coil leakage fluxes gives rise to induced EMF (Ldi/dt) in coils undergoing commutation. As a result of the above phenomena, a deleterious amount of arcing may occur at the brushes.

To overcome the above problem and reduce arcing at the brushes, it is known in the prior art to place commutating poles or interpoles in the commutation zones of the machine for counteracting any induced EMF that may exist in the windings undergoing commutation. To this end, the interpole windings are connected in series with the armature windings so that the influence exerted by the interpoles will vary in relation to the amount by which the effective neutral axes of the machine are shifted.

Conventionally, interpoles have been mounted via a magnetically conductive path to the machine frame and the interpole flux passes through the frame along with the main flux generated by the main field poles. As a result, the frame thickness should be increased to accommodate the interpole flux and the interpole coils must have additional ampere turns to overcome the ampere turns of the armature.

In order to avoid the disadvantages associated with conventional interpoles, it has been proposed as shown in the U.S. Pat. No. 4,220,882 to Kohzai et al. issued Sept. 2, 1980, to employ E-shaped interpoles magnetically isolated from the main frame of the machine. Interpoles of such design have three pole pieces of equal length as measured along the machine axis and the pole pieces lie in overlapping relation such that a given point on the circumference of the armature passing under any one of the pole pieces passes under all three. As a result, the E-shaped interpole is substantially wider than a conventional interpole and the flux leakage between the main field poles via the interpole is quite high. Such leakage decreases the overall performance of the machine and it should be avoided if at all possible.

Accordingly, the primary object of this invention is to provide an interpole assembly for a DC electric machine wherein the interpole is magnetically isolated from the machine frame and wherein the interpole width is relatively small to minimize leakage flux through it between the adjacent main field poles of the machine.

The above object is carried forward according to this invention with a novel interpole core structure that is characterized by separation of certain of the pole pieces along the machine axis. More particularly, the pole piece or pole pieces which conduct magnetic flux from the interpole to the armature are longitudinally separated from the pole piece or pieces which conduct magnetic flux from the armature back into the interpole. Put another way, the pole pieces of each variety (sending and receiving) lie in nonoverlapping relation with respect to the length of the machine axis so that a given point on the circumference of the armature passes under a pole piece or pole pieces of only one such variety. As a result, the width dimension of the interpole transverse to the machine axis may be reduced as compared to the dimension that would otherwise be required. In such event, the leakage flux between adjacent main field poles is thereby significantly reduced, yielding an improvement in the machine performance. As with the conventional interpole, an interpole according to this invention include a coil or coils connected in series with the armature coils and which are effective when so energized to counteract induced EMF in the armature coils undergoing commutation to thereby reduce or eliminate arcing at the brushes. Since the interpole coils are energized with armature current, it will be understood that the flux direction characteristics used above to distinguish between different varieties of pole pieces is relative. That is, when the armature current is reversed to reverse the direction of motor rotation, the flux senders become flux receivers and the flux receivers become flux senders.

This invention is described herein primarily in reference to a preferred embodiment having one pole piece located at a central portion of the interpole and two pairs of pole pieces at the axial ends of the interpole. However, numerous other embodiments are encompassed within the teachings of this invention, several of which are also shown and briefly described herein.

IN THE DRAWINGS

FIGS. 1-4 depict an interpole according to a first preferred embodiment of this invention.

FIG. 1 depicts the interpoles in place in a four-pole DC machine.

FIG. 2 is a perspective drawing of the interpole,

FIG. 3 is an exploded view of the interpole components and

FIG. 4 is a view of the interpole depicting the flux paths therethrough.

FIGS. 5-11 depict interpoles according to alternate embodiments of this invention.

Figure 1:
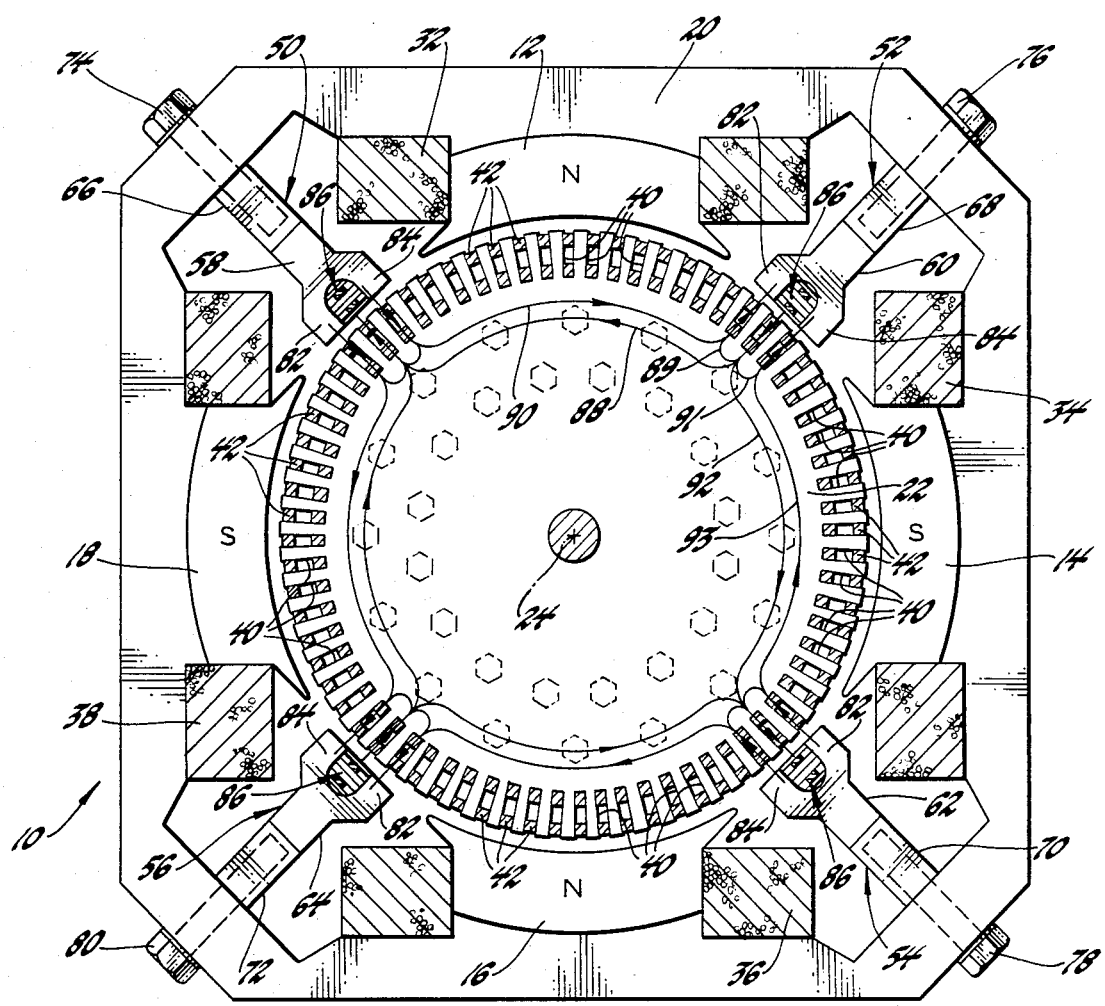

Referring now more particularly to FIG. 1, the reference numeral 10 generally designates a DC machine comprising four main field poles 12-18 disposed within a machine frame 20 and an armature 22 adapted to rotate within the field poles and frame about an axis 24. Each of the main field poles 12-18 has a field coil 32-38 wound therearound as shown in FIG. 1, for developing main field pole magnetic flux. The armature 22 has a number of longitudinally extending slots 40 formed in its periphery, in which slots are received an equal number of armature coils 42. A conventional commutator mechanism including a commutator and brushes (not shown) located at one end of the armature 22 is effective to reverse the current polarity in the armature windings as they rotate through the magnetic neutral axes of the machine.

Four interpole assemblies, generally designated by the reference numerals 50-56, are secured to the machine frame 20 at points intermediate the main field poles 12-18 on the nominal magnetic neutral axes of the motor. Interpoles or commutating poles are conventionally provided in such locations as explained above to counteract induced EMF in the various armature coils as they pass thereunder to reduce or eliminate arcing when the respective armature coils are short-circuited by the brushes. Each of the interpoles 50-56 according to this invention comprises a ferromagnetic core element 58-64 and nonmagnetic spacer element 66-72 secured to the machine frame 20 via a bolt 74-80 threaded into the spacer element 66-72. In each interpole 50-56, the magnetic spacer 66-72 is welded to the ferromagnetic core element 58-64 and operates to magnetically isolate the interpole from the machine frame 20. Each interpole 50-56 (as illustrated with respect to interpole 52) has a pair of arms 82, 84; 82' 84' extending radially inward from each axial end of the respective ferromagnetic core element 58-64, the arms 82' and 84' being hidden in FIG. 1. In addition, each interpole 50-56 (as also illustrated with respect to interpole 52) includes a coil and yoke assembly 86 situated intermediate the pairs of arms 82, 84 and 82' 84'.

When the interpole coils are energized with electrical current, magnetic flux in proportion to the magnitude of such current is circulated through the paths indicated in FIG. 1. The flux paths for interpole 52 are designated by the reference numerals 88-93. The arrows on the various flux lines indicate the flux direction when the interpole coils are energized in a direction to result in the interpole magnetic polarities shown in FIG. 1. According to the usual convention, flux is emitted from the "north" poles and returned to the "south" poles. It will be understood, of course, that the direction of the interpole magnetic flux is reversed when the interpole coils are energized in the opposite direction.

Figure 2:
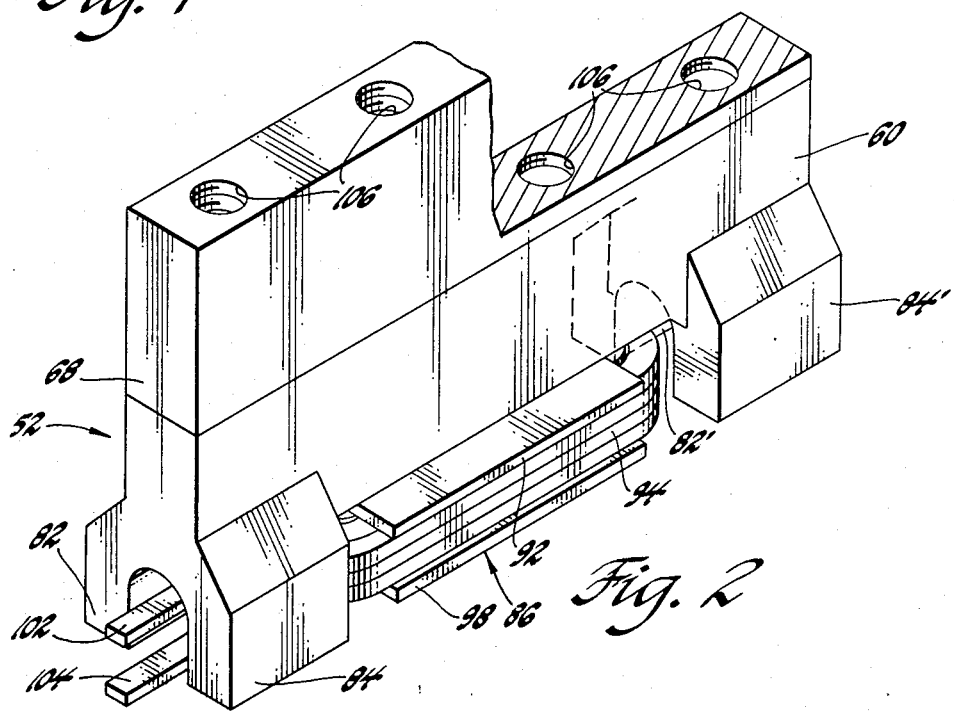

FIGS. 2-4 more particularly depict the interpole 52 of FIG. 1; where appropriate, reference numerals used in FIG. 1 have been repeated. As seen most clearly in FIG. 3, the coil and yoke assembly 86 of interpole 52 comprises a nonmagnetic top plate 92 welded to the inner radial face of core element 60, an insulated electrical coil 94, a ferromagnetic yoke 96, and a nonmagnetic bottom plate 98. The bolts 100 pass through the elements 92-98 of the coil and yoke assembly 86 and serve to secure the same to the core element 60. The bolts 100 are countersunk into bottom plate 98 to reduce the radial dimension of the interpole 52. Thus, the coil 94 is disposed about the yoke 96 and is sandwiched between the top plate 92 and the bottom plate 98. The ferromagnetic core element 60 includes two pairs of integral arms 82, 84; 82' 84', at the axial ends thereof and the terminals 102 and 104 of coil 94 pass between the arms 82 and 84 as seen in FIG. 2. The spacer 68 includes four tapped openings 106 on the outer radial face thereof for receiving the bolts 76 which secure the interpole 52 to the machine frame 20 as shown in FIG. 1.

As seen most clearly in FIG. 4, the yoke 96 of interpole 52 extends radially inward to face the armature 22 substantially at the point of commutation. The arms 82, 84; 82', 84' extend radially inward to face the armature 22 at points circumferentially adjacent the point of commutation. When the coil 94 is energized with current in a direction that causes the yoke 96 to assume a "north" magnetic polarity and the arms 82, 84; 82', 84' to assume a "south" magnetic polarity, magnetic flux is circulated through the armature 22 and core element 60 in paths represented by the lines 88-93. When the armature 22 is at or near zero speed, the interpole flux travels primarily from yoke 96 to the arms 82, 84; 82', 84' along the lines 89, 91; 89' and 91'. When the armature 22 is at or near its rated speed, the interpole flux travels primarily from interpole to interpole along the lines 88, 92, 90, 93, 90' and 93'. Since the arms 82, 84; 82', 84' are circumferentially displaced from the yoke 96, the armature conductor 42 undergoing commutation is subjected to magnetic flux of only one direction. Furthermore, since the arms 82, 84; 82', 84' are longitudinally displaced from the yoke 96, the overall width dimension of the interpole 52 along the circumference of the armature 22 as shown by the letter W in FIG. 4 may be significantly reduced as compared to the E-shaped interpole known in the prior art. Such reduction in width is achieved by positioning the arms 82, 84; 82', 84' at least partially within the the width dimension of the coil 94, as seen most clearly in FIG. 2. Due to the relatively narrow interpole width afforded by the teachings of this invention, the distance between the interpole and the adjacent main field poles is relatively large thereby minimizing the leakage flux between adjacent main field poles.

Seven alternate embodiments of this invention are depicted in FIGS. 5-11. In each case, the same inventive features and advantages described in reference to the first preferred embodiment are present.

Figure 5:
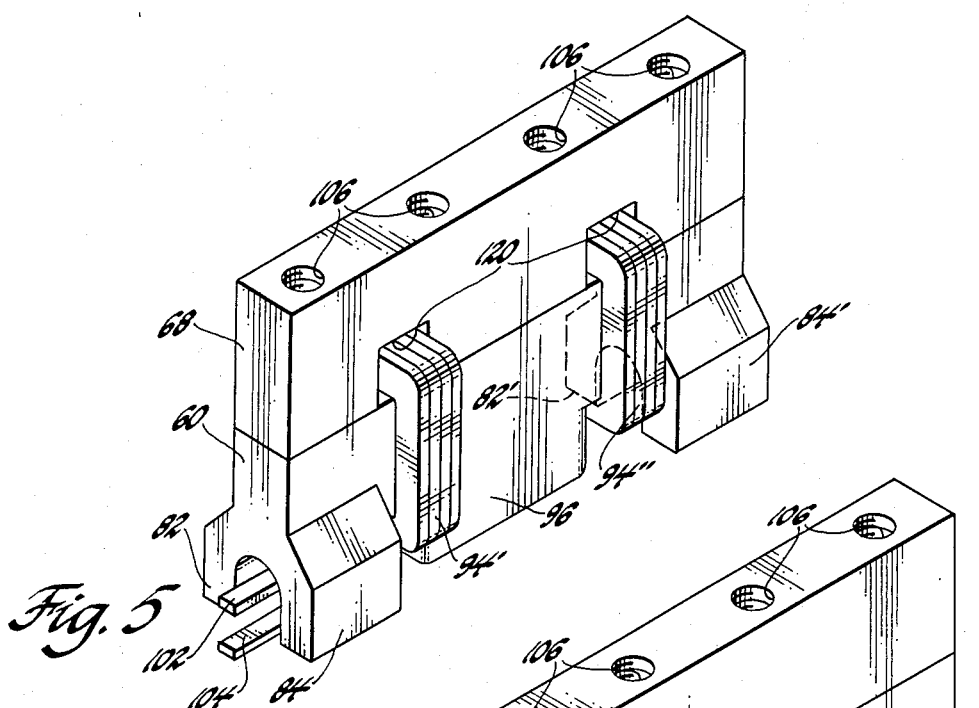

FIG. 5 depicts an embodiment wherein the interpole coil 94 is divided into two coil sections 94' and 94", the coils being wound around the core element 60 on either side of the yoke 96. In such case, the yoke 96 could be made integral with the core element 60. The coils 94' and 94" could be connected in series and the terminals 102 and 104 brought out between the arms 82 and 84, as in the preferred embodiment. Suitable openings 120 are provided in the spacer 68 to permit passage of the coils 94' and 94" therethrough.

Figure 6:
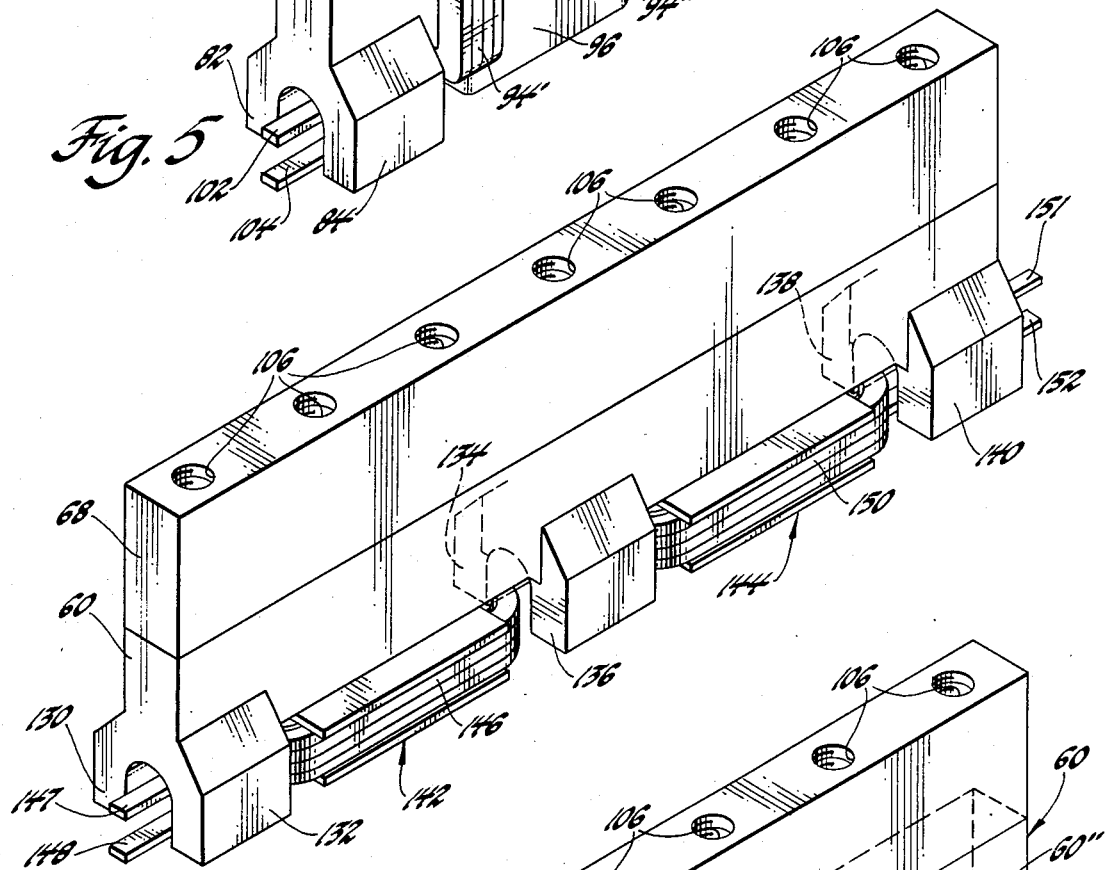

The alternate embodiment depicted in FIG. 6 is essentially an extension of the preferred embodiment depicted in FIGS. 1-4, and would find application in machines having a relatively large core length/core diameter ratio. In such case, multiple pairs of arms 130, 132; 134, 136; and 138, 140 are provided along the length of the core element 60 and yoke/coil assemblies 142, 144 are situated between adjacent arm pairs. The coil 146 of yoke/coil assembly 142 has terminals 147, 148 which pass through the arms 130 and 132, and the coil 150 of yoke/coil assembly 144 has terminals 151, 152 which pass between the arms 138 and 140. The coils 146 and 150 are energized such that the yokes of yoke/coil assemblies 142 and 144 and arms 130-140 are of opposite magnetic polarity. It will be understood, of course, that the interpole design may be further extended, if the application requires, to have one or more additional pairs of arms and yoke/coil assemblies.

The alternate interpole embodiments depicted in FIGS. 7-11 each have fewer pole pieces (flux emitters and receivers) than the embodiments depicted in FIGS. 1-6. The capacity to conduct interpole flux depends on the surface area of the various pole pieces and hence the pole pieces of the alternate embodiments depicted in FIGS. 7-11 would have to be enlarged as compared to those shown in FIGS. 1-6 in order to achieve the same flux conducting capacity. Although the increased pole piece area may not be evident in the FIGS. 7–11, it will be understood that there is some discretion in the design of the interpole as to whether the increased area is achieved through increased width and/or length of the various pole pieces. To the extent the pole pieces are increased in width, the flux leakage between adjacent main field poles through the interpole is increased.

Figure 7:
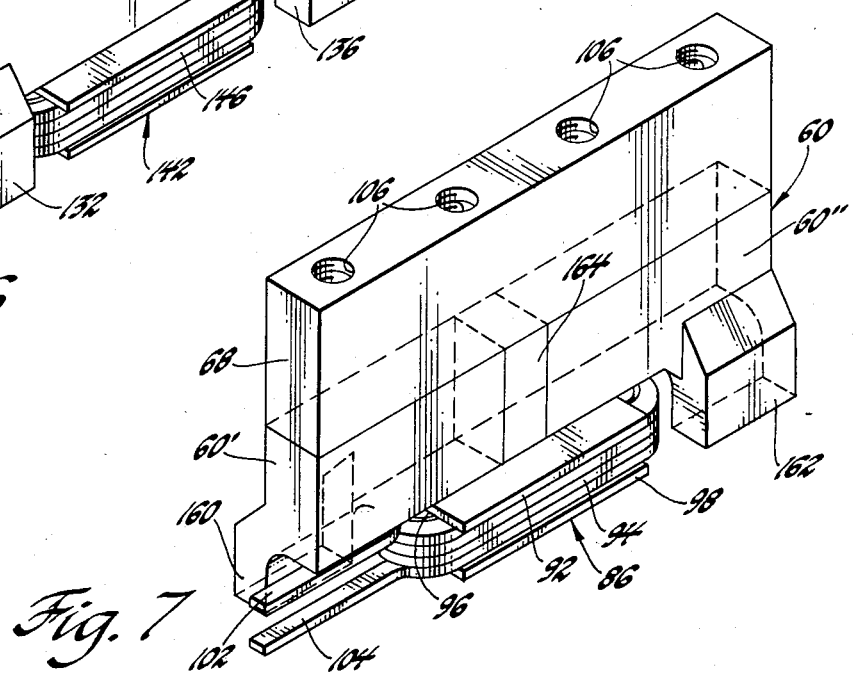

The alternate embodiment depicted in FIG. 7 includes one coil yoke assembly 86 and two arms 160 and 162, the arms 160 and 162 being circumferentially displaced form the yoke 96 in opposite directions. The core element 60 in such case is formed of two ferromagnetic sections 60' and 60'' separated by a nonmagnetic spacer 164 welded therebetween. The nonmagnetic spacer 164 serves to decrease the effective magnetic width of the interpole to thereby decrease the main field pole-to-main field pole flux leakage that would otherwise occur.

The alternate embodiment depicted in FIG. 8 has two coil and yoke assemblies 86' and 86'' at either end of the core element 60 and a pair of circumferentially displaced arms 170 and 172 therebetween. This embodiment may be advantageous in that the terminals 174–177 of the coils 94' and 94'' are not disposed between the ferromagnetic core arms 170 and 172 and therefore are more accessible and less likely to short out.

The alternate embodiment depicted in FIG. 9 has two arms 184 and 186 at either end of the core element 60 disposed directly over the commutation zone of the machine and a pair of arms 180 and 182 therebetween which are disposed circumferentially adjacent to the commutation zone. The coil 94 is wound around a yoke 96 between the main body of the core element 60 and the arms 180 and 182, and the coil terminals 102 and 104 pass on either side of the arm 186.

The alternate embodiment depicted in FIG. 10 has one coil and yoke assembly 86 on one end of the core element 60 and a pair of circumferentially displaced arms 190 and 192 at the other end of the core element 60. To achieve the same interpole length as in the other interpole embodiments and to increase the surface are of the pole pieces, the arms 190 and 192 may be lengthened as shown.

The alternate embodiment depicted in FIG. 11 has one coil and yoke assembly 86 secured to the midsection of the core element 60 above the commutation zone of the machine and one arm 194, 196 at each end of the core element 60 circumferentially displaced from the yoke 96. The lack of bilateral symmetry makes this embodiment most suitable for use with unidirectional machines.

The inventive feature common to all of the illustrated embodiments resides in the longitudinal separation of the flux emitting and flux receiving pole pieces as measured with respect to the length dimension of the machine axis. This feature permits the overall width of the interpole to be reduced because the circumferential displacement of the flux emitting and flux receiving pole pieces can be reduced without mechanical interference between the electrical coil and the various pole pieces. Such reduced width significantly reduces the main field pole to main field pole leakage through the interpole and thereby improves the performance of the machine.

It will be understood that the scope of this invention is not limited by the various interpole embodiments illustrated herein. Various modifications and alternate embodiments will occur to those skilled in the art and such modifications and alternate embodiments may well be within the scope of this invention which is defined by the appended claims.

The embodiments of the invention in which an exclusive property or privilege is claimed are defined as follows:

1. In an interpole located intermediate a pair of main field poles in a DC machine for circulating magnetic flux in a closed loop path which extends in part through a portion of the armature of the machine as the armature rotates about the machine axis, the interpole including a pair of pole pieces one of which conducts flux from the interpole into the armature and the other of which conducts flux from the armature into the interpole, the flux conducted through one of the pole pieces intercepting each armature winding of the machine as the winding rotates through a commutation position in which the direction of current flow through the winding is reversed by a commutator mechanism and the flux conducted through the other pole piece bypassing the winding as it rotates through the commutation position, the flux intercepting each winding in the commutation position acting to counteract the induced EMF that would otherwise exist in the winding as it rotates through the commutation position thereby to reduce commutator arcing; the improvement wherein:

the pair of pole pieces of the interpole are so positioned and so configured that they are spaced in nonoverlapping relation as measured with respect to the dimension of the machine axis so that the general dimension of the interpole extending between the pair of main field poles transverse to the machine axis may be reduced as compared to the general dimension that would be required if an overlapping relation between the pole pieces existed, thereby to effect a reduction in the leakage flux between said pair of main field poles.

2. In an interpole located intermediate a pair of main field poles within the frame of a DC machine for circulating magnetic flux within a closed loop path which extends in part through a portion of the armature of the machine as it rotates about the machine axis, the interpole including a main core element magnetically isolated from the machine frame, and a pair of flux conducting means extending radially inward therefrom to face the armature, a selective one of which pair emits flux into the armature and the other of which receives flux from the armature, the flux conducted through one of the flux conducting means intercepting each armature winding of the machine as the winding rotates through a commutation position in which the direction of current flow through the winding is reversed by a commutator mechanism and the flux conducted through the other flux conducting means bypassing the winding as it rotates through the commutation position, the flux intercepting each winding in the commutation position acting to counteract the induced EMF that would otherwise exist in the winding, thereby to reduce commutator arcing; the improvement wherein:

the pair of flux conducting means are secured to the main core element in nonoverlapping relation with respect to the machine axis so that the width dimension of the interpole extending between the pair of main field poles transverse to the machine axis may be reduced as compared to the width dimension that would be required if an overlapping relation between the flux conducting means existed, thereby to effect a reduction in the leakage flux between said pair of main field poles.

3. The improvement set forth in claim 2, wherein:
one of the flux conducting means includes a magnetic yoke disposed substantially midway along the length of the main core element, and the other flux conducting means includes a bifurcated magnetic arm disposed substantially at each longitudinal end of the main core element.

4. In an interpole located intermediate a pair of main field poles within the frame of a DC machine for circulating interpole magnetic flux within a closed loop path which extends in part through a portion of the armature of the machine as it rotates about the machine axis, the interpole including a main core element magnetically isolated from the machine frame having a length dimension parallel to the machine axis and a width dimension transverse to the machine axis, and first and second flux conducting means extending radially inward from the main core element to face the armature, a selective one of which emits flux into the armature and the other of which receives flux from the armature, the flux conducted through one of the flux conducting means intercepting each armature winding of the machine as the winding rotates through a commutation position in which the direction of current flow through the winding is reversed by a commutator mechanism and the flux conducted through the other of the flux conducting means bypassing the winding as it rotates through the commutation position, the flux intercepting each winding in the commutation position acting to counteract the induced EMF that would otherwise exist in the winding, thereby to reduce commutator arcing; the improvement wherein:
the first flux conducting means has disposed thereabout an electrical coil for generating interpole magnetic flux; and
the second flux conducting means is positioned along the length dimension of the main core element so as to be in nonoverlapping relation with the first flux conducting means and electrical coil as measured with respect to a line parallel to the machine axis, and along the width dimension of the main core element so as to be in at least partial overlapping relation with the electrical coil as measured with respect to a line transverse to the machine axis, thereby to effect a reduction in the overall width of the interpole and a corresponding reduction in the main field pole-to-main field pole leakage flux.

5. The improvement set forth in claim 4, wherein:
the first flux conducting means includes a magnetic yoke disposed substantially midway along the length of the main core element, and the second flux conducting means includes a bifurcated magnetic arm disposed substantially at each longitudinal end of the main core element.

* * * * *